(12) United States Patent
Yoo et al.

(10) Patent No.: US 11,798,199 B2
(45) Date of Patent: Oct. 24, 2023

(54) METHOD AND APPARATUS FOR CONFIGURING SPATIAL INFORMATION

(71) Applicant: Electronics and Telecommunications Research Institute, Daejeon (KR)

(72) Inventors: Jae Jun Yoo, Daejeon (KR); In Sung Jang, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 312 days.

(21) Appl. No.: 17/023,902

(22) Filed: Sep. 17, 2020

(65) Prior Publication Data
US 2021/0110578 A1  Apr. 15, 2021

(30) Foreign Application Priority Data
Oct. 10, 2019  (KR) .................. 10-2019-0125283

(51) Int. Cl.
*G06T 9/40* (2006.01)
*H04N 19/96* (2014.01)
*G06T 17/00* (2006.01)

(52) U.S. Cl.
CPC ............. *G06T 9/40* (2013.01); *G06T 17/005* (2013.01); *H04N 19/96* (2014.11)

(58) Field of Classification Search
CPC .... H04N 19/70; H04N 19/597; H04N 19/176; H04N 19/30; H04N 19/96; H04N 19/119; H04N 19/1883; G06T 9/40; G06T 17/005; G06T 17/05; G06T 2207/20021; G06F 16/29; G06F 16/2246; G06F 16/9027;
(Continued)

(56) References Cited

U.S. PATENT DOCUMENTS

| | | | | |
|---|---|---|---|---|
| 2011/0302194 | A1* | 12/2011 | Gonzalez | G06F 16/29 707/769 |
| 2013/0127870 | A1* | 5/2013 | Baudel | G06F 9/451 345/441 |
| 2016/0224551 | A1 | 8/2016 | Sample et al. | |

FOREIGN PATENT DOCUMENTS

| | | | | |
|---|---|---|---|---|
| CN | 105046734 | A * | 11/2015 | |
| EP | 2747032 | A1 * | 6/2014 | G06T 17/005 |

(Continued)

OTHER PUBLICATIONS

Annotated Search machine translation: Method for The Photorealistic Visualisation of a Three-dimensional Terrain Data Set In Real-time of EP-2 747 032 A1 to Wahl et al., retrieved Sep. 13, 2022, 13 pages. (Year: 2022).*

(Continued)

*Primary Examiner* — Matthew C Bella
*Assistant Examiner* — Dennis Rosario
(74) *Attorney, Agent, or Firm* — KILE PARK REED & HOUTTEMAN PLLC (57) ABSTRACT

Disclosed are an apparatus and method for configuring spatial information required to visualize a space represented based on a hierarchical structure having a plurality of levels each of which includes one or more tiles, configuring spatial information. The method includes checking tile visibility of each level according to whether a tile exists in the corresponding level; grouping one or more levels in which tile visibility is consistently maintained into one or more groups; and assigning a tile visibility index to each group.

12 Claims, 8 Drawing Sheets

(58) Field of Classification Search
CPC .............. G06F 40/146; G06F 40/14; G09G 2340/0407; G09G 2360/122; G09G 2340/045; G09G 2340/12; G09G 2340/04
See application file for complete search history.

(56) References Cited

FOREIGN PATENT DOCUMENTS

| KR | 10-2010-0136604 | 12/2010 |
|----|----------------|---------|
| KR | 10-1017433 | 2/2011 |
| KR | 10-2015-0059422 | 6/2015 |
| KR | 10-2016-0084147 | 7/2016 |
| KR | 10-2019-0099954 | 8/2019 |

OTHER PUBLICATIONS

Search machine translation II: Method for The Photorealistic Visualisation of a Three-dimensional Terrain Data Set In Real-time of EP 2 747 032 A1 to Wahl , retrieved Feb. 16, 2023, 13 pages. (Year: 2023).*

Misund et al., Global Models and the W3DS Specification—Challenges and Solutions, Jun. 21-22, 2005 [retrieved Feb. 16, 2023], 1st International Workshop on Next Generation 3D City Models, 124 pages total, pp. 69-75. (Year: 2005).*

[item V continued] Retrieved: https://www.researchgate.net/publication/343539567_Proceedings_of_the_1st_International_Workshop_on_Next_Generation_3D_City_Models_21-22_June_2005_Bonn_Germany_Jointly_organized_by_University_of_Bonn_DGPF_EuroSDR_and_ISPRS (Year: 2005).*

Search machine translation of CN 105046734 A: A Grid Tile Pyramid Dynamically Generating and Updating Method and System to Ren et al., Nov. 11, 2015 [translated Jun. 9, 2023], 9 pages. (Year: 2023).*

* cited by examiner

METHOD AND APPARATUS FOR CONFIGURING SPATIAL INFORMATION

CROSS-REFERENCE TO RELATED APPLICATIONS

This application claims priority to Korean Patent Application No. 10-2019-0125283 filed on Oct. 10, 2019 in the Korean Intellectual Property Office (KIPO), the entire contents of which are hereby incorporated by reference.

BACKGROUND

1. Technical Field

The present disclosure relates to a method and an apparatus for configuring spatial information, and more specifically, to a method and an apparatus for configuring spatial information required to visualize a space represented based on tiles configured in a hierarchical structure having a plurality of levels.

2. Related Art

Recently, Internet maps such as Google map, Naver map that is a map service of the most popular portal site in Korea, and V-world are widely recognized and used as base systems that provides various services and information. These Internet maps build a grid of cells each of which has a specific size, and is usually called a tile, at various levels or at various levels of detail (LoD) to maintain, manage, and provide information, thereby efficiently delivering a large amount of information.

According to design and implementation, levels for a specific map layer are generally implemented as twenty or fewer levels, and meaning of each level depends on the implementation. The size represented by one tile at each level depends on a predefined size, and the number of levels of a specific map layer and the size represented by the tile at a specific level may vary depending on a type of the map (e.g. satellite images, vector etc).

As various types of services directly and indirectly related to a space are actively developed and provided, and a complexity of the services is gradually increasing, is the demands of constructing and providing spatial information for $2^{nd}$ order, $3^{rd}$ order, or higher order space are increasing.

A representative example of such the demands is provision of web-based maps. That is, in the web-based map, one map layer may be composed of multiple levels, and each level may be composed of multiple tiles. In addition, in configuring the web-based map, the number of tiles configuring a level increases exponentially as the level represents a specific target area.

When the number of tiles constituting the level increases exponentially as described above, it is impossible to store all tiles for each level in the terminal visualizing the map. Therefore, the terminal may request tiles to the server for a portion to be visualized as needed, and thus the terminal visualizes the portion by using the tiles received from the server. Due to a reason of the performance in this structure, in order to reduce the number of transmission requests for tiles, which are transmitted from the terminal to the server, the recently-used tiles are cached or buffered.

The types of maps to be visualized in the terminal may be various. There may be a map based on an image taken from a satellite or aircraft, or a vector-based map. This is because map layers having various meanings may be created according to various application purposes.

However, in case of a tile that does not actually contain any information and a lower layer having data without gaps within a specific tile of a higher layer, although they are not required to be visualized a procedure of identifying that the corresponding tile, which the terminal requested to the server, exist, does not actually exist, thereby causing a problem of deteriorating the performance of visualizing the web-based map.

SUMMARY

Accordingly, exemplary embodiments of the present disclosure are provided to substantially obviate one or more problems due to limitations and disadvantages of the related art.

Exemplary embodiments of the present disclosure provide a method for configuring spatial information, which does not visualize a tile that does not actually include data when visualizing a tile-type map on the web.

Exemplary embodiments of the present disclosure also provide a method for efficiently encoding tile visibility information even when tiles are composed of multiple levels and higher and lower tiles do not include consistent information.

In an exemplary embodiment, a method for configuring spatial information can include; configuring spatial information required to visualize a space represented based on a hierarchical structure having a plurality of levels each of which includes one or more tiles, the method comprising: checking tile visibility of each level according to whether a tile exists in the corresponding level; grouping one or more levels in which tile visibility is consistently maintained into one or more groups; and assigning a tile visibility index to each group.

The method can be further comprising encoding the tile visibility index into a file.

The tile visibility index can be used to search for a level belonging to a group to which the tile visibility index is assigned when visualizing the space according to the spatial information.

A tile visibility information for a tile constituting each level can include a complete-occupied state in which the entire tile is occupied by space visualization data, a non-occupied state in which the tile is not occupied by space visualization data or a partial-occupied state in which a part of the tile is occupied by space visualization data.

The tile visibility information can be represented in form of a quad-tree including relationship among the plurality of levels.

The checking of the tile visibility of each level can comprise distinguishing between a space that needs to be visualized and a space that does not need to be visualized.

The grouping can comprise artificially generating a higher level so that the tile visibility is consistent based on tile visibility information existing at a top level for each group.

In another exemplary embodiment, an apparatus for configuring spatial information can include; configuring spatial information required to visualize a space represented based on a hierarchical structure having a plurality of levels each of which includes one or more tiles, the apparatus comprising: a processor; and a memory storing at least one command executable by the processor, wherein the at least one command comprises: a command for checking tile visibility of each level according to whether a tile exists in the corresponding level; a command for grouping one or more levels in which tile visibility is consistently maintained into one or more groups; and a command for assigning a tile visibility index to each group.

The apparatus can be further comprising a command for encoding the tile visibility index into a file.

The tile visibility index can be used to search for a level belonging to a group to which the tile visibility index is assigned when visualizing the space according to the spatial information.

A tile visibility information for a tile constituting each level can include a complete-occupied state in which the entire tile is occupied by space visualization data, a non-occupied state in which the tile is not occupied by space visualization data or a partial-occupied state in which a part of the tile is occupied by space visualization data.

The tile visibility information can be represented in form of a quad-tree including relationship among the plurality of levels.

The command for checking of the tile visibility of each level can comprise a command for distinguishing between a space that needs to be visualized and a space that does not need to be visualized.

The command for grouping can comprise a command for artificially generating a higher level so that the tile visibility is consistent based on tile visibility information existing at a top level for each group.

According to the exemplary embodiments of the present disclosure as described above, the speed of transmitting visibility information of tiles for each level of a spatial information layer, which is configured in form of tiles necessary to visualize the web map, can be improved.

According to an exemplary embodiment of the present disclosure as described above, even when tile visibility information of higher and lower levels are inconsistent, visibility information of tiles necessary to visualize the web map can be transmitted.

According to an exemplary embodiment of the present disclosure as described above, the number of times tiles are requested from the terminal to the server for visualization of the corresponding layer can be minimized.

BRIEF DESCRIPTION OF DRAWINGS

Exemplary embodiments of the present disclosure will become more apparent by describing in detail embodiments of the present disclosure with reference to the accompanying drawings, in which.

DETAILED DESCRIPTION

While the invention is susceptible to various modifications and alternative forms, specific embodiments thereof are shown by way of exemplary in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in detail with reference to the accompanying drawings.

Figure 1:
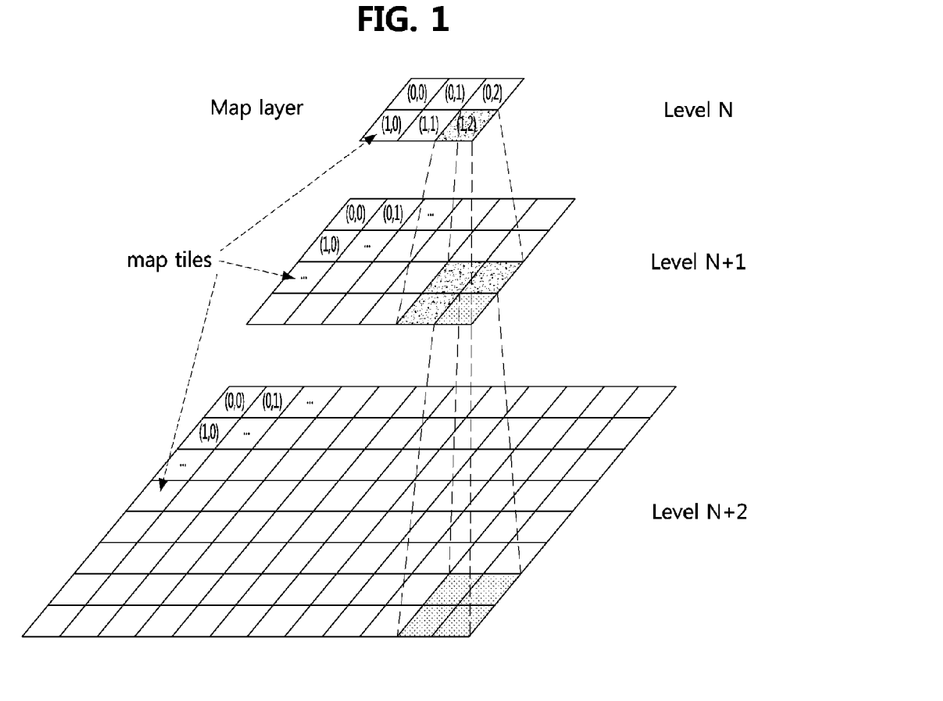
FIG. 1 is a conceptual diagram illustrating a configuration example of a map having tile-based multiple levels.

FIG. 1 is a conceptual diagram illustrating a configuration example of a map having tile-based multiple levels.

As shown in FIG. 1, there is shown an example in which one map layer is composed of several levels (e.g. N, N+1, N+2) and each level includes a plurality of tiles.

In configuration of a web-based map shown in FIG. 1, it may be identified that the number of tiles constituting a level increases exponentially as the level represents a specific region. In general, a tile of a specific level may be represented by four tiles at a lower level visualizing the map more specifically than the corresponding level.

The configuration of tiles for each level is also related to a method of assigning identifiers (IDs) for designating (or identifying) tiles for each level. For example, in a layer composed of one to fourteen levels, when a level 1 is composed totally of twenty tiles with five horizontal tiles and four vertical tiles, a level 2 is composed of eighty tiles (i.e., (5×2)×(4×2)=80). When such the calculation is applied for each level, a level 14 may be composed of 1,342,177,280 tiles (i.e., (5×2^13)×(4×2^13)=1,342,177,280).

As the level goes down to the lower level, the number of tiles constituting the level increases exponentially, an apparatus or a terminal in which the map is visualized may not be able to store all data of the tiles related to the map. Thus, the apparatus or the terminal may visualize the map by requesting tiles to a server for a map portion to be visualized as required. Due to a reason of the performance in the above-described structure, in order to reduce the number of transmission requests for tiles, which are transmitted from the terminal to the server, the recently used tiles may be cached or buffered.

Meanwhile, the types of maps to be visualized at the terminal may be various. The map may be an image taken from a satellite or an aircraft, or the map may be a vector-based map. This is because a map layer having various meanings may be generated according to various application purposes. In addition, some of the layers constituting the map may not include data on the whole world or South Korea, but may include data only for some regions.

Figure 2:
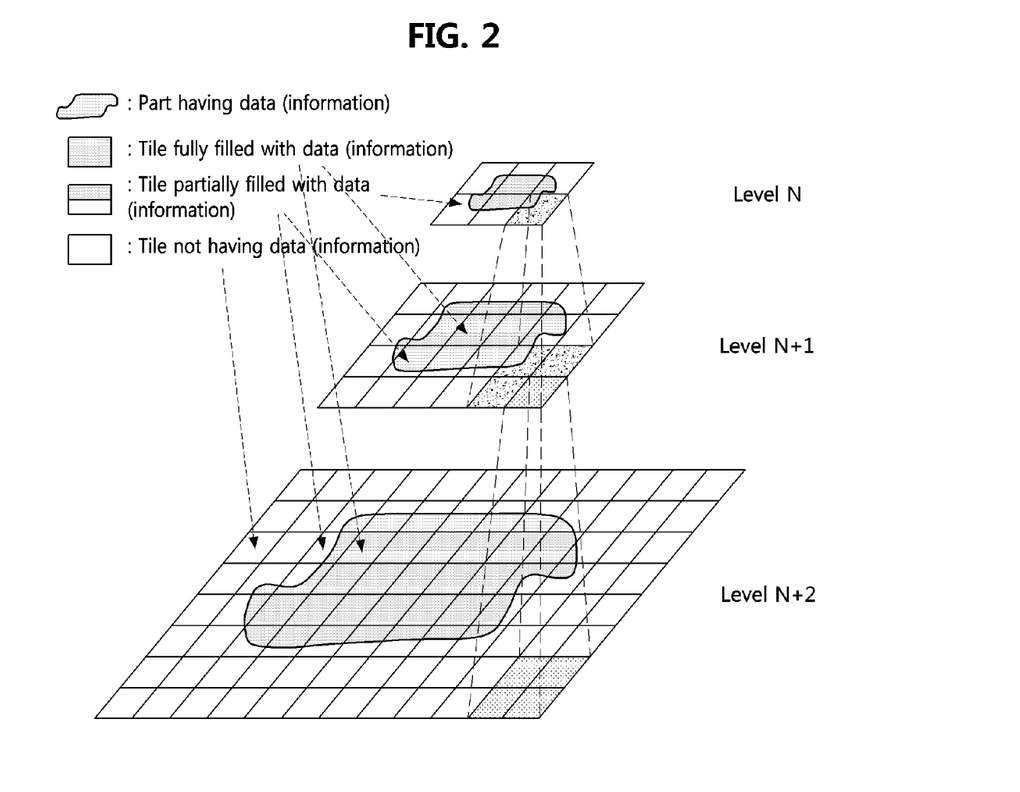
FIG. 2 is a conceptual diagram illustrating another configuration example of a map having tile-based multiple levels.

FIG. 2 is a conceptual diagram illustrating another configuration example of a map having tile-based multiple levels.

FIG. 2 illustrates a case where data exists only for a specific region in the configuration of the layer for each level shown in FIG. 1.

As shown in FIG. 2, tiles that do not actually contain any information may not need to be requested to the server for visualization, etc. In addition, when specific levels of several layers are visualized as overlapped, if data is exist without gaps within a specific tile of a higher level since a lower level is invisible to the user even though it is visualized, it may not be requested to be visualized from the terminal to the server. However, in the current system, since tiles that do not actually contain any information are requested to be visualized and a procedure for identifying whether or not the corresponding tiles actually are necessary is performed, the web-based map visualization performance is deteriorating.

In order to solve the above problems, the present disclosure provides a method of expressing how much visualization information a tile for each level of specific tile layer includes by using a quad-tree. That is, provided is a method of expressing compactly how the corresponding tile should be visualized. Therefore, according to exemplary embodiments of the present disclosure, visibility information of tiles existing in multiple levels may be encoded very efficiently.

Here, tile visibility information, that is, information about how much visualization data a specific tile includes may be expressed as follows. A non-occupied state may mean a case in which the corresponding tile does not include information. That is, it may mean that the corresponding tile does not include visualization data.

In addition, a partial-occupied state may mean a case where information exists only in a part of the tile. That is, the corresponding tile is required to be visualized, and when the corresponding tile exists on a specific tile of another level, the specific tile may also need to be requested to be visualized.

In addition, a complete-occupied state may mean a case where information is present in the entire tile. That is, the corresponding tile needs to be visualized, and when the corresponding tile exists on a specific tile of another level, the specific tile may not need to be visualized.

Here, at least 2 bits may be used for visualization of each tile.

Figure 3:
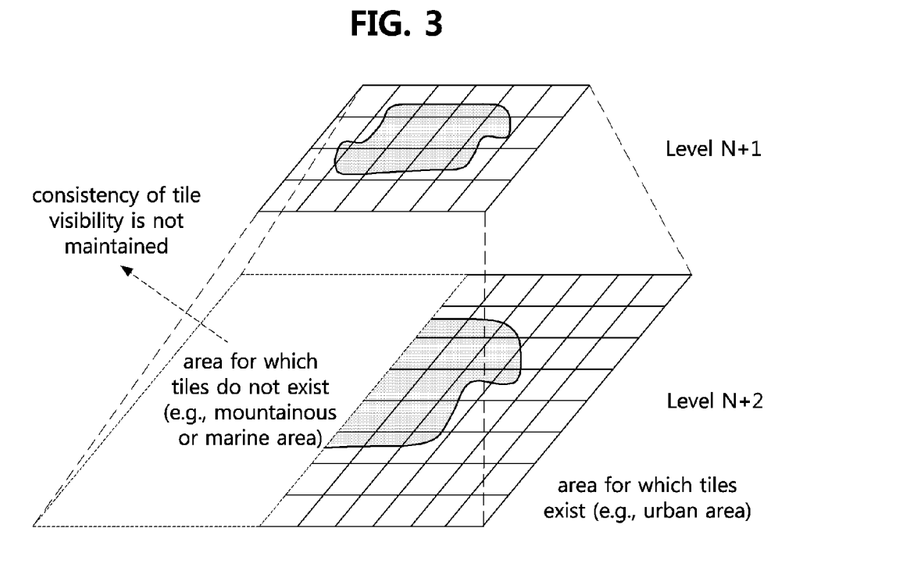
FIG. 3 is conceptual diagram for describing consistency of tile visibility information.

FIG. 3 is conceptual diagram for describing consistency of tile visibility information. As shown in FIG. 3, in order to encode visibility information for tiles included in all levels of a specific spatial information layer, the following matters should be premised.

A node of a quad-tree may be constructed only for tiles in the partial-occupied state or the complete-occupied state. That is, a tile whose visibility information is in the non-occupied state may not be constructed in the quad-tree. Therefore, when visibility information of a higher tile indicates the non-occupied state, visibility information of tiles of a lower level corresponding to the higher tile may also be in the non-occupied state. This may mean that when a tile of a higher level does not contain any information, tiles of a lower level corresponding to the higher tile do not contain any information.

In addition, when visibility information of a higher tile indicates the complete-occupied state, all four tiles of a lower level corresponding to the higher tile may also indicate the complete-occupied state. That is, if the higher tile is fully filled with visualization information, all tiles of a lower level may also be filled with visualization information.

On the other hand, when visibility information of a higher tile indicates the partial-occupied state, all four tiles of a lower level corresponding to the higher level may not be in the non-occupied state or in the complete-occupied state. That is, when visualization information is partially present in the higher tile, one or more of tiles of a lower level corresponding to the higher tile may partially include visualization information.

Accordingly, it is efficient to encode visibility information of tiles for a plurality of levels in the quad-tree on the premise of the definition of the tile visibility information and the conditions of the tile visibility information of the higher and lower levels.

However, as shown in FIG. 3, in case of a layer composed of aerial images, tiles may be constructed intensively for specific areas (e.g., urban area). In addition, such the differentiated configuration of levels according to areas may be used for urban areas and rural areas. For example, referring to FIG. 3, since many spatial objects exist within a small region of the urban area, a larger number of levels may be constructed. On the other hand, in case of a mountainous or rural area it may not be required to express the corresponding area as detailed as the urban area, and thus only a small number of levels may be constructed. Therefore, there may be a case where tile visibility between the higher level and the lower level is inconsistent.

Figure 4:
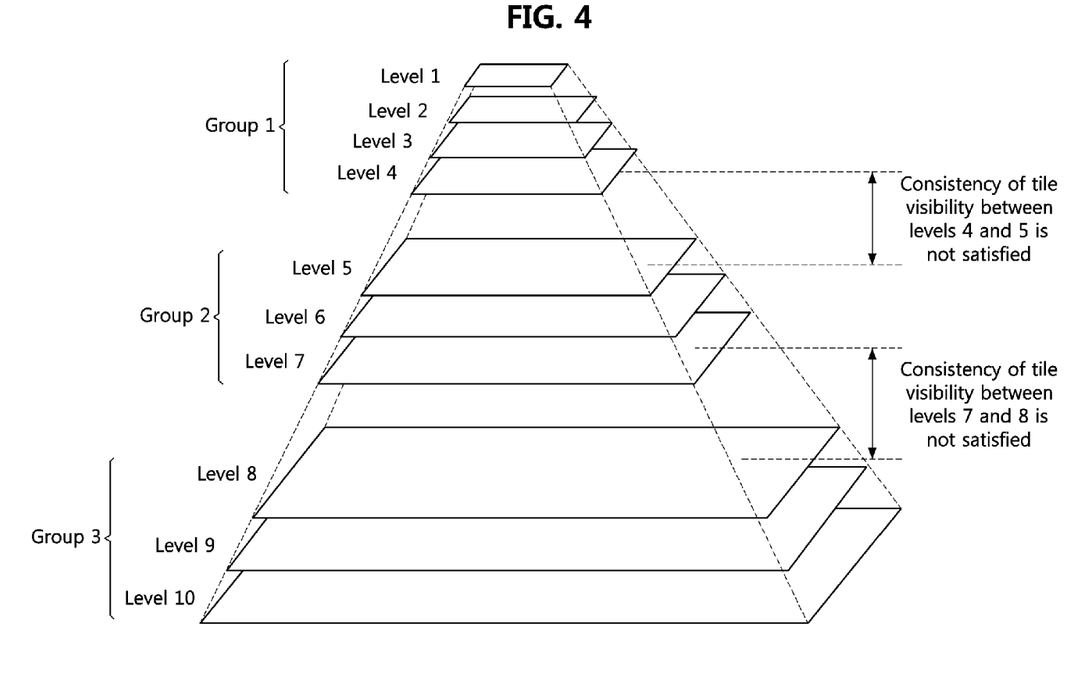
FIG. 4 is a conceptual diagram for describing a method of configuring a group in a map space having the tile-based multiple levels to which exemplary embodiments of the present disclosure are applied.

FIG. 4 is a conceptual diagram for describing a method of configuring a group in a map space having the tile-based multiple levels to which exemplary embodiments of the present disclosure are applied.

According to the present disclosure, a group may be formed based on spatial visualization data that tiles of higher level and lower level include. For example, as shown in FIG. 4, a corresponding layer is composed of ten levels, and tiles of a determined size may exist in each level, and whether tile visibility between a higher level and a lower level are consistent may be confirmed. As a result, since tile visibility between levels 4 and 5, and tile visibility between levels 7 and 8 are inconsistent, the levels 1 to 4 may be formed into a group 1, the levels 5 to 7 may be formed into a group 2, and the levels 8 to 10 may be formed into a group 3. Therefore, tile visibility is consistent among levels belonging to each group.

In particular, when a higher level does not exist for a specific group, a virtual higher level may be generated so that tile visibility is consistent. For example, since the group 2 has only the levels 5, 6, and 7, levels 4, 3, 2, and 1 may be generated, and since the group 3 has only the levels 8, 9, and 10, levels 7, 6, 5, 4, 3, 2, and 1 may be generated. That is, virtual higher levels may be generated artificially so that tile visibility is consistent.

According to the present disclosure, even when tile visibility between a higher level and a lower level is not consistent, quad-tree based tile visibility information may be encoded. Through this, the visibility information may be efficiently expressed in a way that does not depend on the relationship of the visibility information between the higher level and the lower level, thereby smoothly transmitting tiles and related information from the server to the terminal, and improving the tile visualization performance at the terminal.

Figure 5:
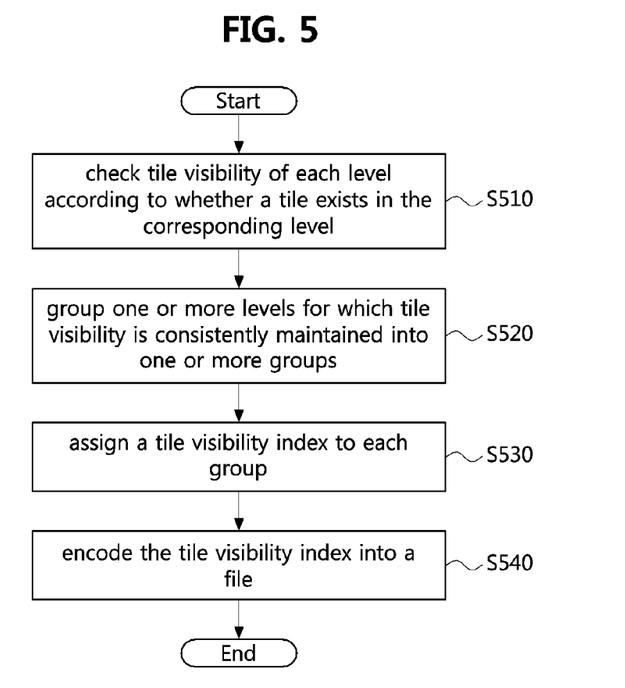
FIG. 5 is a flowchart of a method for encoding tile visibility information.

FIG. 5 is a flowchart of a method for encoding tile visibility information.

The method for encoding tile visibility information according to the present disclosure may include a step S510 of checking tile visibility of each level according to whether a tile exists in the corresponding level.

Subsequently, a step S520 of grouping one or more levels in which tile visibility is consistent may be included.

Subsequently, a step S530 of assigning a tile visibility index to each group may be included. Because tile visibility of all the levels belonging to each group is consistent, the tile visibility index may be constructed. In this case, when a certain higher level does not belong to a specific group due to inconsistent tile visibility, the higher level may be artificially generated that tile visibility is consistent. However, tile visibility index may be constructed when the higher level does not exist with consistent tile visibility, when the higher level exists with consistent tile visibility, visibility information for tiles of a lower level corresponding to the higher level may be more compactly encoded.

Subsequently, a step S540 of encoding the tile visibility index into a file may be included. Wherein, the visibility information of a specific tile may be searched by querying the tile visibility index of a group which the tile is included.

Figure 6:
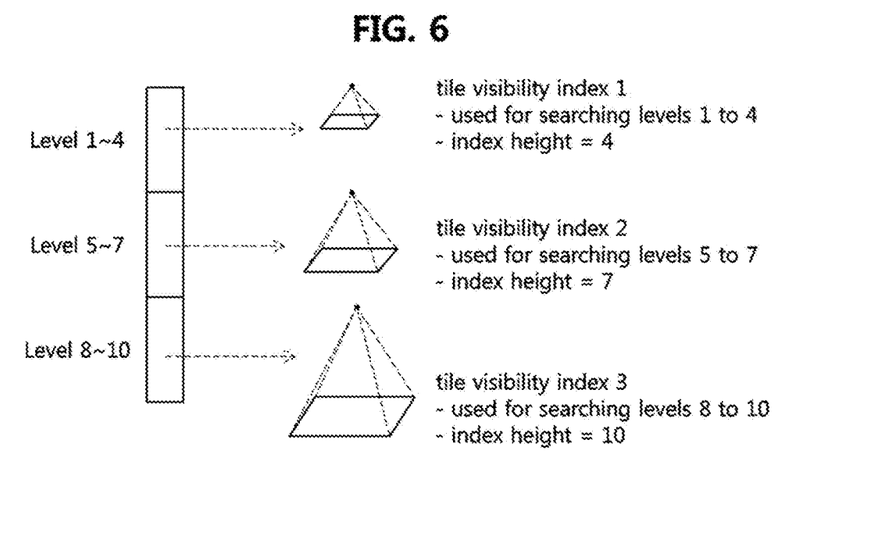
FIG. 6 is a conceptual diagram illustrating an exemplary embodiment of a method for encoding tile visibility information.

FIG. 6 is a conceptual diagram illustrating an exemplary embodiment of a method for encoding tile visibility information.

According to the present disclosure, tile visibility information may be encoded even if tile visibility is inconsistent when comparing spatial visualization data included in tiles of a higher level and a lower level corresponding to the higher tile.

As shown in FIG. 4, when higher levels are artificially generated to ensure consistent tile visibility in the groups 2 and 3, the tile visibility is consistent in all levels belonging to each group, so that tile visibility information can be encoded more effectively. That is, tile visibility information may be encoded even when tile visibility is inconsistent, but when a higher level having consistent tile visibility exists for each group, tile visibility information for tiles of a lower level corresponding to the higher level may be more effectively encoded.

As shown in FIG. 6, according to the present disclosure tile visibility information may be encoded by forming groups each of which has consistent tile visibility as described above, so that a search for an effective level of each group may be performed. That is, a tile visibility index 1 may be used when searching levels 1 to 4, a tile visibility index 2 may be used when searching levels 5 to 7, and a tile visibility index 3 may be used when searching levels 8 to 10. Here, an index height may mean the number of levels of each group.

Accordingly, exemplary embodiments of the present disclosure may effectively encode tile visibility information for all levels, even for a layer composed of levels that are not constructed with appropriate tiles according to characteristics of areas, such as urban areas, marine areas, mountainous areas, and other situations and reasons. For example, when multiple layers are overlapped or when multiple tiles need to be visualized by overlapping, it is possible to prevent a request for visualization of tiles that do not need to be visualized by being located at a lower level. In addition, exemplary embodiments according to the present disclosure may effectively visualize a space by performing a search only for a required level using the encoded tile visibility information as described above.

Specifically, exemplary embodiments of the present disclosure may express tile visibility information as a file in the server so that tiles constructing each level of a specific layer compactly include tile visibility information. In addition, tile visibility information of a higher level and lower level of the layer may be independently considered, so that tile visibility information may be expressed as a file even if the tile visibility information of the higher level and lower level is not consistent.

In addition, encoded information may be transmitted from a server to a terminal, and may be decoded at the terminal, so that tile visibility information for each level and each tile of a corresponding layer may be inquired. Therefore, the visualization performance of web-based map may be improved and a network between the terminal and the server may be reduced.

Figure 7:
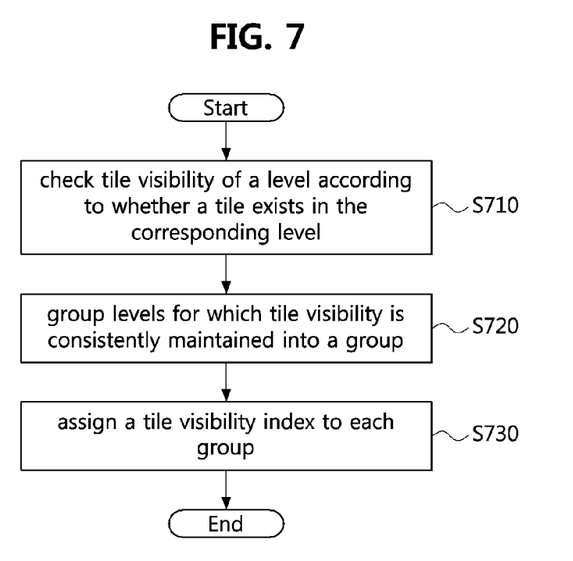
FIG. 7 is a flowchart of a method for configuring spatial information according to an exemplary embodiment of the present disclosure.

FIG. 7 is a flowchart of a method for configuring spatial information according to an exemplary embodiment of the present disclosure.

As shown in FIG. 7, a method for configuring spatial information according to an exemplary embodiment of the present disclosure is a method for configuring spatial information required to visualize a space represented based on a hierarchical structure having a plurality of levels each of which includes one or more tiles, it may include a step S710 of checking tile visibility of each level according to whether a tile exists in the corresponding level.

Wherein, tile visibility information for a tile constituting each level may include a complete-occupied state in which the entire tile is occupied by space visualization data, a non-occupied state in which the tile is not occupied by the space visualization data or a partial-occupied state in which a part of the tile is occupied by the space visualization data.

In addition, the checking of the tile visibility of each level may comprise distinguishing between a space that needs to be visualized and a space that does not need to be visualized.

On the other hand, the tile visibility information may be represented in form of a quad-tree including relationship among the plurality of levels.

In addition, the method for configuring spatial information may include a step of S720 grouping one or more levels for which tile visibility is consistently maintained into one or more groups.

Wherein, the grouping may comprise artificially generating a higher level so that the tile visibility is consistent based on tile visibility information existing at a top level for each group.

In addition, the method for configuring spatial information may include a step of S730 assigning a tile visibility index to each group.

Wherein, the method for configuring spatial information may further comprises a step of encoding the tile visibility index into a file.

In addition, the tile visibility index may be used to search for a level belonging to a group to which the tile visibility index is assigned when visualizing the space according to the spatial information.

Figure 8:
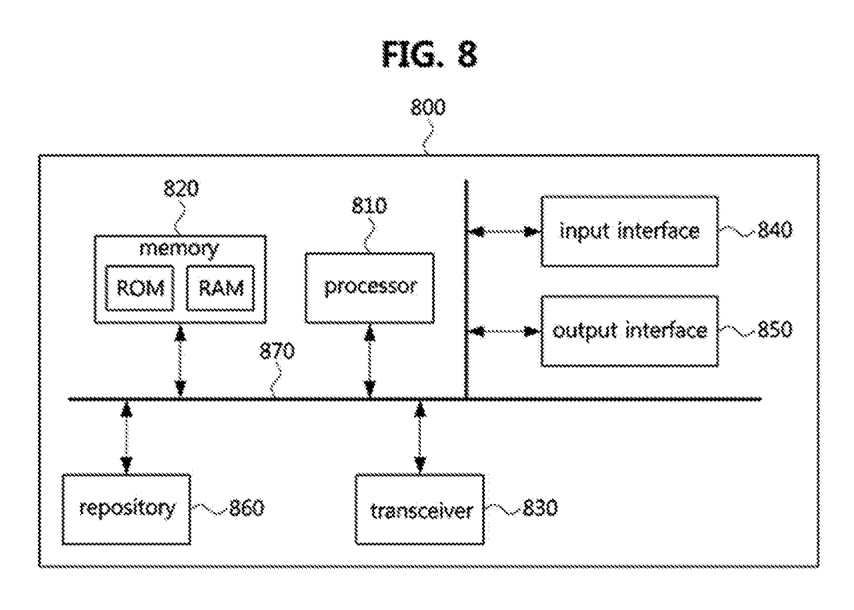
FIG. 8 is a block diagram of an apparatus for configuring spatial information according to an embodiment of the present disclosure.

FIG. 8 is a block diagram of an apparatus for configuring spatial information according to an embodiment of the present disclosure.

An apparatus 800 for configuring spatial information according to an exemplary embodiment of the present disclosure may include at least one processor 810, a memory 820 which stores at least one command executed by the processor 810, and a transceiver 830 which is connected to a network to perform communication.

The apparatus 800 for configuring spatial information may further include an input interface 840, an output interface 850, a repository 860, and the like. The elements included in the apparatus 800 for configuring spatial information may be connected through a bus 870 and communicate with each other.

The processor 810 may execute program commands stored in at least one of the memory 820 and the repository 860. The processor 810 may be a CPU, a GPU, or a dedicated processor whereby methods according to exemplary embodiments of the present disclosure are performed. Each of the memory 820 and the repository 860 may be configured with at least one of a volatile storage medium and a non-volatile storage medium. For example, the memory 820 may be configured with at least one of a read-only memory (ROM) and a random access memory (RAM).

The repository 860 may also store space visualization data included in at least one tile belonging to each level of space, and may store tile visibility information of tiles based on the space visualization data. And also, the repository 860 may store a tile visibility index generated by using the tile visibility information.

The at least one command may include a command for checking tile visibility of each level according to whether a tile exists in the corresponding level; a command for grouping one or more levels for which tile visibility is consistently maintained into one or more groups; and a command for assigning a tile visibility index to each group.

The at least one command may be further comprising a command for encoding the tile visibility index into a file.

The command for checking of the tile visibility of each level may comprise a command for distinguishing between a space that needs to be visualized and a space that does not need to be visualized.

The command for grouping may comprise a command for artificially generating a higher level so that the tile visibility is consistent based on tile visibility information existing at a top level for each group.

The operations of the method according to the embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such a apparatus.

Although the present disclosure has been described with reference to preferred embodiments, it will be apparent to those skilled in the art that the present disclosure may be variously changed and modified without departing from the spirit and scope of the invention defined in the following claims.

What is claimed is:

1. An operation method of an apparatus for configuring spatial information required to visualize a space represented based on a hierarchical structure having a plurality of levels each of which includes one or more tiles, the apparatus interfacing with a server providing images, the operation method comprising:

receiving an image from the server checking tile visibility of each level constituting the received image, according to whether a tile exists in the corresponding level;

grouping one or more levels in which tile visibility is consistently maintained into one or more groups;

assigning a tile visibility index to each group;

determining that the tile visibility between a higher level and a lower level is not consistent; and in response to determining that the tile visibility between the higher level and the lower level is not consistent, encoding a quad-tree based tile visibility information with a visibility information being expressed such that the visibility information does not depend on the relationship of the visibility information between the higher level and the lower level, wherein the grouping comprises artificially generating a higher level so that the tile visibility is consistent based on tile visibility information existing at a top level for each group.

2. The operation method according to claim 1, further comprising encoding the tile visibility index into a file.

3. The operation method according to claim 1, wherein the tile visibility index is used to search for a level belonging to a group to which the tile visibility index is assigned when visualizing the space according to the spatial information.

4. The operation method according to claim 1, wherein the tile visibility information for a tile constituting each level includes a complete-occupied state in which an entire tile is occupied by space visualization data, a non-occupied state in which the tile is not occupied by space visualization data, or a partial-occupied state in which a part of the tile is occupied by space visualization data.

5. The operation method according to claim 4, wherein the tile visibility information is represented in form of a quad-tree including relationship among the plurality of levels.

6. The operation method according to claim 1, wherein the checking of the tile visibility of each level comprises distinguishing between a space that needs to be visualized and a space that does not need to be visualized.

7. An apparatus for configuring spatial information required to visualize a space represented based on a hierarchical structure having a plurality of levels each of which includes one or more tiles, the apparatus interfacing with a server providing images, the apparatus comprising:
a processor; and
a memory storing at least one command executable by the processor,
wherein the at least one command comprises:
a command for receiving an image from the server;
a command for checking tile visibility of each level according to whether a tile exists in the corresponding level;
a command for grouping one or more levels in which tile visibility is consistently maintained into one or more groups;
a command for assigning a tile visibility index to each group,
a command for determining whether the tile visibility between a higher level and a lower level is not consistent; and
a command for, in response to determining that the tile visibility between the higher level and the lower level is not consistent, encoding a quad-tree based tile visibility information with a visibility information being expressed such that the visibility information does not depend on the relationship of the visibility information between the higher level and the lower level,
wherein the command for grouping comprises a command for artificially generating a higher level so that the tile visibility is consistent based on tile visibility information existing at a top level for each group.

8. The apparatus according to claim 7, wherein the at least one command further includes a command for encoding the tile visibility index into a file.

9. The apparatus according to claim 7, wherein the tile visibility index is used to search for a level belonging to a group to which the tile visibility index is assigned when visualizing the space according to the spatial information.

10. The apparatus according to claim 7, wherein tile visibility information for a tile constituting each level includes a complete-occupied state in which an entire tile is occupied by space visualization data, a non-occupied state in which the tile is not occupied by space visualization data or a partial-occupied state in which a part of the tile is occupied by space visualization data.

11. The apparatus according to claim 10, wherein the tile visibility information is represented in form of a quad-tree including relationship among the plurality of levels.

12. The apparatus according to claim 7, wherein the command for checking the tile visibility of each level comprises a command for distinguishing between a space that needs to be visualized and a space that does not need to be visualized.

* * * * *